(12) United States Patent
Rippelmeyer et al.

(10) Patent No.: US 10,228,053 B2
(45) Date of Patent: Mar. 12, 2019

(54) METHOD OF REDUCING REQUIRED MACHINING ON A PIN TYPE CARRIER

(71) Applicant: Toyota Motor Engineering & Manufacturing North America, Inc., Erlanger, KY (US)

(72) Inventors: Luke A. Rippelmeyer, Canton, MI (US); Jeremy L. Cummings, Dexter, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 137 days.

(21) Appl. No.: 15/199,438

(22) Filed: Jun. 30, 2016

(65) Prior Publication Data

US 2018/0003288 A1    Jan. 4, 2018

(51) Int. Cl.
| | |
|---|---|
| *F16H 57/08* | (2006.01) |
| *B23P 15/14* | (2006.01) |
| *B23B 51/08* | (2006.01) |
| *F16H 57/12* | (2006.01) |

(52) U.S. Cl.
CPC ........... *F16H 57/082* (2013.01); *B23B 51/08* (2013.01); *B23P 15/14* (2013.01); *F16H 57/12* (2013.01)

(58) Field of Classification Search
CPC ........ F16H 57/082; F16H 57/12; B23P 15/14; B23B 51/08
See application file for complete search history.

(56) References Cited

U.S. PATENT DOCUMENTS

| | | | |
|---|---|---|---|
| 5,915,895 A | 6/1999 | Jager et al. | |
| 6,200,078 B1 | 3/2001 | Kubota | |
| 6,773,211 B2 | 8/2004 | Zackrisson et al. | |
| 7,556,583 B2 | 7/2009 | Wang et al. | |
| 8,602,698 B2 | 12/2013 | Craig et al. | |
| 2012/0108380 A1* | 5/2012 | Dinter | F16C 17/26 475/159 |
| 2015/0105212 A1* | 4/2015 | Graham | B23P 6/00 475/331 |
| 2015/0247566 A1* | 9/2015 | McKinzie | F16H 57/0479 475/159 |
| 2015/0330498 A1* | 11/2015 | Carlino | F16H 57/0479 475/159 |
| 2015/0345591 A1* | 12/2015 | Altamura | F16H 57/0479 475/159 |
| 2016/0116055 A1* | 4/2016 | Engblom | F16H 57/082 475/331 |
| 2016/0258528 A1* | 9/2016 | Carlino | F16H 57/082 |

* cited by examiner

*Primary Examiner* — David J Hlavka
(74) *Attorney, Agent, or Firm* — Christopher G. Darrow; Darrow Mustafa PC

(57) ABSTRACT

A method of reducing the required machining on a pin type carrier, such as a planetary gear carrier, may utilize a combined drilling and milling operation to reduce the required machining. A hole in a surface may be formed during the drilling operation and the surface may be machined to a desired level during the milling operation. A tool having a leading drill feature and a trailing mill feature may be used to sequentially form the hole and mill the surface in a single operation.

20 Claims, 4 Drawing Sheets

METHOD OF REDUCING REQUIRED MACHINING ON A PIN TYPE CARRIER

FIELD

The subject matter described herein relates in general to pin type carriers and, more particularly, to a method of reducing required machining on a pin type carrier.

BACKGROUND

Pin type carriers may come in a variety of configurations, such as a planetary gear carrier. Shafts in the carriers are typically rotationally and axially secured by use of a pin extending through a hole in the carrier and into a bore in the shaft. The pin is secured to the carrier by a staking operation wherein the head of the pin is struck by a striking tool to deform the pin. The deformation secures the pin to the carrier. Proper deformation requires that the pin extend below the surface immediately adjacent to the hole a predetermined amount. The predetermined amount ensures that the resulting deformation is sufficient to retain the pin in the carrier while also not imparting too great a stress on the carrier.

To achieve the predetermined amount of extension, the surface having the hole in which the pin is inserted is typically machined to a desired height or distance relative to a reference point. The machining operation requires multiple steps. For example, depending on the complexity of the carrier, some surfaces may be required to be individually machined, such as by milling, and the hole formed subsequent or prior to the machining. This is a time consuming process. As another example, depending on the complexity of the carrier, some surfaces may be machined simultaneously by using a lathe and the hole formed subsequent or prior to the machining. The use of a lathe results in the larger surface area being machined. This large area is typically more than that needed to provide the proper staking of the pin. As a result, excess machining takes place increasing machining time and cost. Thus, it would be advantageous if a more efficient machining operation could be utilized to create the hole and achieve the predetermined amount of extension.

SUMMARY

A method of reducing the required machining on a pin type carrier, such as a planetary gear carrier, may utilize a combined drilling and milling operation to reduce the required machining. A hole in a surface may be formed during the drilling operation and the surface may be machined to a desired level during the milling operation. A tool having a leading drill feature and a trailing mill feature may be used to sequentially form the hole and mill the surface in a single operation.

In one respect, the present disclosure is directed to a pin type carrier. The pin type carrier includes a carrier member, a plurality of mounting features, a plurality of shafts and a plurality of pins. The carrier member has a plurality of openings. The plurality of mounting features are disposed along the carrier member adjacent the openings. The mounting features have a top surface and a hole extending therethrough. The plurality of shafts each have a radially extending bore therein with a portion of the shafts being disposed in the openings with the bore aligned with the hole in the associated mounting feature. The plurality of pins have opposite first and second ends and a length therebetween. The pins are disposed in the holes in the mounting features with the first ends disposed in the aligned bore. The pins rotationally and axially secure the shafts relative to the carrier member. A partial portion of the top surface adjacent the hole is machined to a specific radial dimension which is different than the radial dimension of the remaining portion of the top surface. At least one of the second end of each pin and the hole is deformed thereby retaining the pin to the carrier member.

In another respect, the present disclosure is directed to a method of assembling a pin type carrier. The method includes providing a carrier member having a plurality of openings extending therethrough and a plurality of mounting features each having a surface and disposed about the carrier member adjacent the openings. The method includes drilling a hole through the surfaces of the mounting features and into the adjacent openings. The method includes machining a partial portion of the surfaces adjacent the holes so that the partial portions have a predetermined dimension different than a dimension of the remaining portions. The method includes inserting shafts into the openings with a bore on each shaft aligned with the hole in the associated mounting feature. The method includes inserting pins into the aligned holes and bores so that first ends of the pins are bottomed out in the bores and second ends of the pins extend below the partial portion of the surfaces. The method includes staking the pins to the carrier member thereby rotationally and axially securing the shafts relative to the carrier member.

In yet another respect, the present disclosure is directed to a method of assembling a planetary gear carrier. The method includes providing a carrier member having a plurality of openings extending therethrough and a plurality of mounting features each having a top surface and disposed about the carrier member adjacent the openings. The method includes providing a cover with plurality of openings extending therethrough. The method includes drilling a hole through the surfaces of the mounting features and into the adjacent openings. The method includes machining a partial portion of the surfaces adjacent the holes so that the partial portions have a predetermined radial dimension different than a radial dimension of the remaining portions. The method includes inserting first ends of shafts into the openings in the carrier member with a bore on each shaft aligned with the hole in the associated mounting feature. The shafts have a roller bearing and a gear thereon. The method includes inserting second ends of the shafts into the openings in the cover. The method includes attaching the cover to the carrier member. The method includes inserting pins into the aligned holes and bores so that first ends of the pins are bottomed out in the bores and second ends of the pins extend below the partial portion of the surfaces. The method includes staking the pins to the carrier member thereby rotationally and axially securing the shafts relative to the carrier member. The drilling and machining steps are performed in a single process with a tool having a leading drill portion and a trailing milling portion.

BRIEF DESCRIPTION OF THE DRAWINGS

FIG. 3 is an enlarged fragment view of a portion of the pin type carrier of FIG. 1.

DETAILED DESCRIPTION

Figure 1:
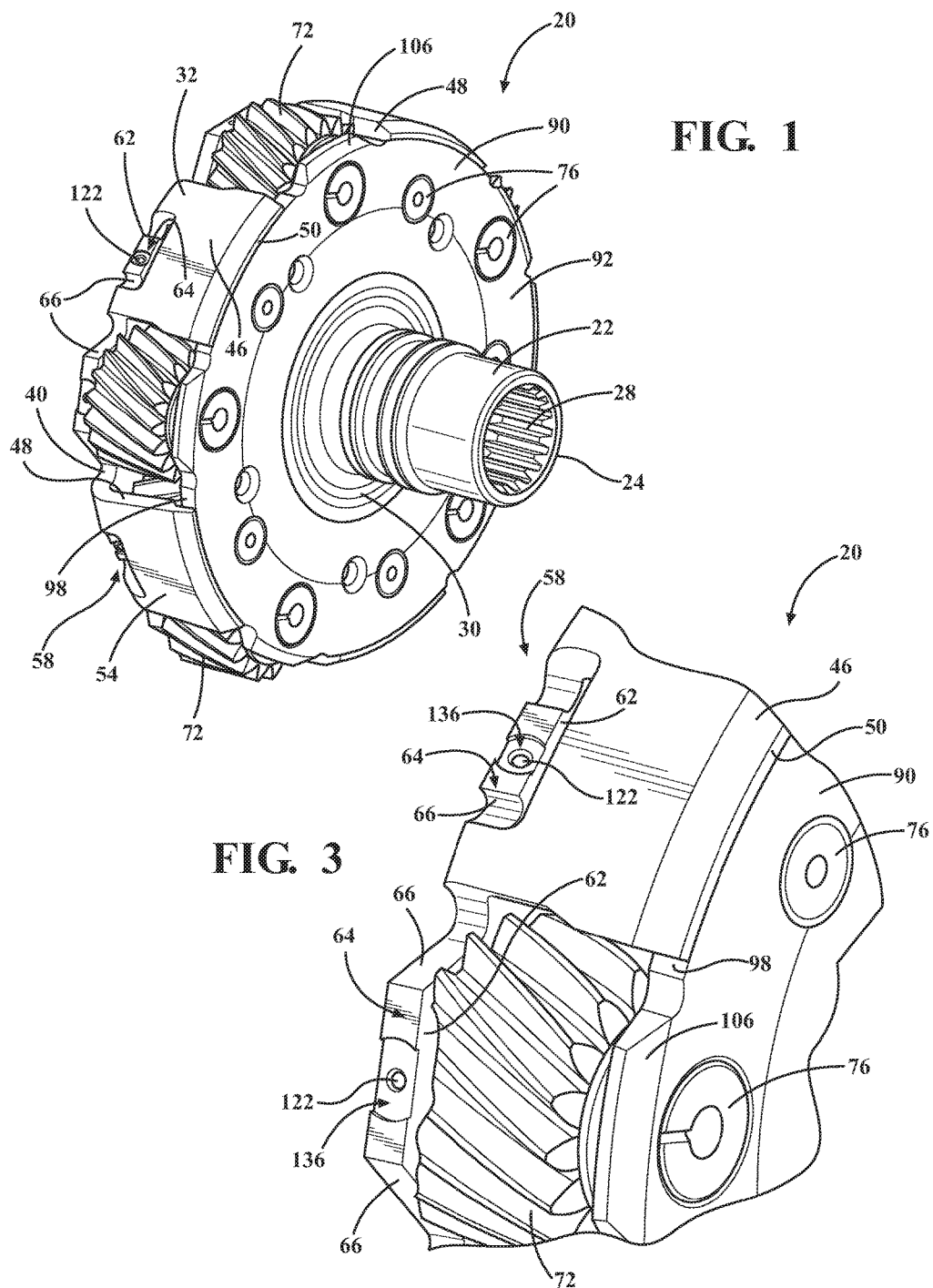
FIG. 1 is a perspective view of an exemplary pin type carrier having reduced required machining.
Figure 2:
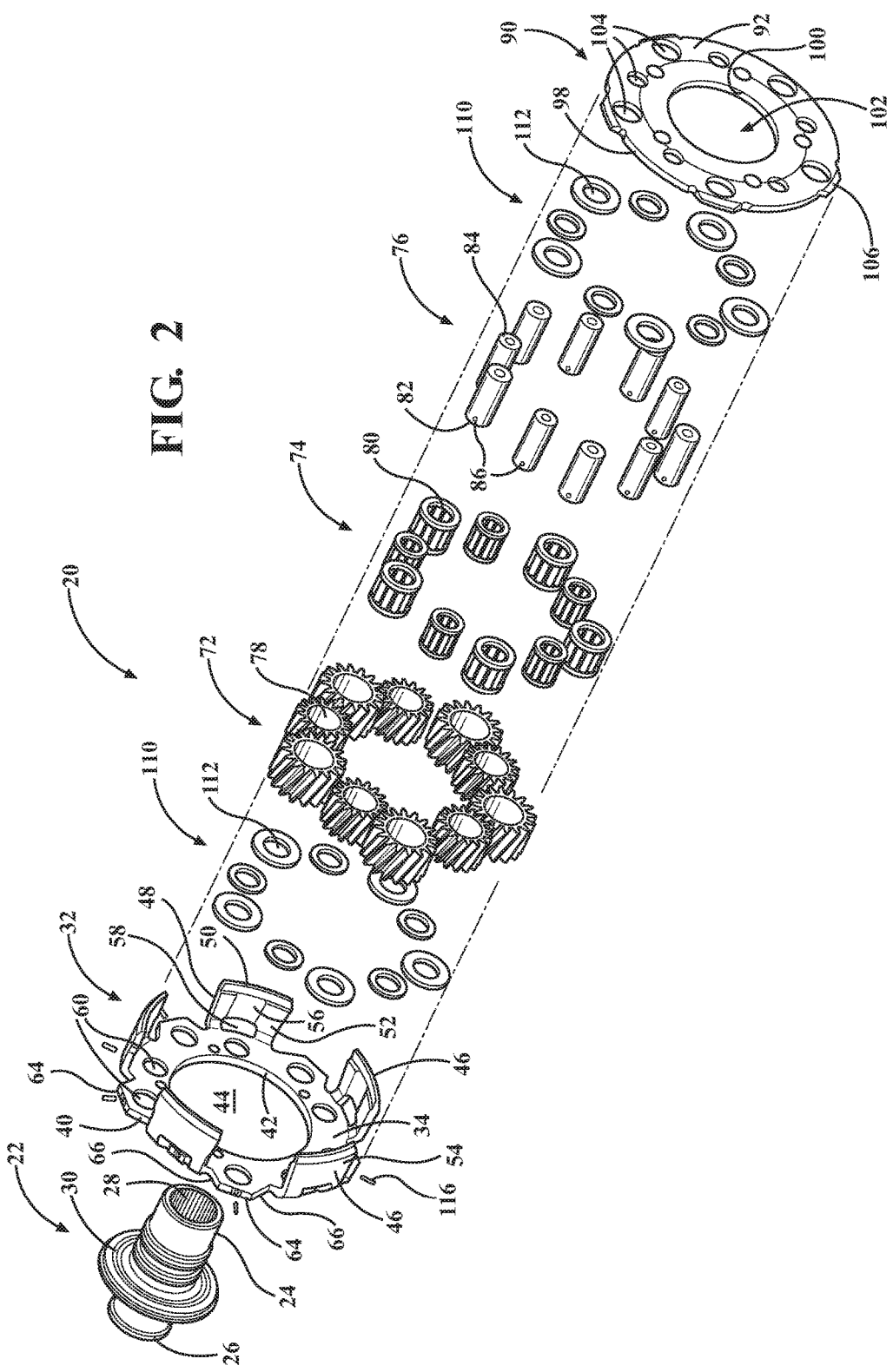
FIG. 2 is an assembly view of the pin type carrier of FIG. 1.

This detailed description relates a method of reducing the required machining on a pin type carrier, such as a planetary gear carrier. The method may utilize a combined drilling and milling operation to reduce the required machining. A hole in a surface may be formed during the drilling operation and the surface may be machined to a desired level during the milling operation. A tool having a leading drill feature and a trailing mill feature may be used to sequentially form the hole and mill the surface in a single operation.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the Figures, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIGS. 1-4, an exemplary pin type carrier 20 on which the method of the present disclosure may be utilized is shown. While carrier 20 is shown in the form of a planetary gear carrier, it should be appreciated that carrier 20 may take other forms. Carrier 20 may include a shaft 22 having opposite first and second ends 24, 26. First end 24 may include a bore 28 therein. Bore 28 may be splined for receipt and engagement with a splined end of another shaft or component (not shown). A flange 30 may be on shaft 22 between first and second ends 24, 26.

Carrier 20 may include a carrier member 32. Carrier member 32 may include an annular base 34 with opposite first and second surfaces with radially outer and inner walls 40, 42 extending therebetween. Outer wall 40 defines a radially outer periphery of carrier member 32. Inner wall 42 defines a central opening 44 through which shaft 22 may be inserted. A plurality of extensions or ears 46 may extend from carrier member 32 adjacent outer wall 40. Ears 46 may have a pair of sidewalls 48, a free end 50 and opposite inner and outer surfaces 52, 54. Inner surface 52 may have an arcuate recess 56 therein. An opening 58 may be present in ear 46 adjacent outer wall 40. Base 34 may include a plurality of openings 60 that extend between the first and second surfaces. Outer wall 40 may include a plurality of mounting features 62 spaced apart therealong. Mounting features 62 may extend radially outwardly and may include a top surface 64 and sidewalls 66. A mounting feature 62 may be radially outward of each opening 60. Carrier member 32 may be stamped metal by way of non-limiting example. Carrier member 32 may have dimensional tolerances of +/−300 microns by way of non-limiting example. Carrier member 32 may be a high-strength low-alloy steel by way of non-limiting example.

Carrier 20 may include a plurality of pinion gears 72, roller bearings 74, and bearing shafts 76. Roller bearings 74 may be needle roller bearings by way of example. Gears 72 may have an opening 78 into which bearings 74 may be disposed. Bearings 74 may have an opening 80 into which shafts 76 may be disposed. Bearings 74 allow gears 72 to rotate on shafts 76. Shafts 76 have opposite first and second ends 82, 84 with an axial length therebetween. Each shaft 76 may have a radially extending bore 86 adjacent its first end 82. The axial length of shafts 76 may be longer than an axial length of bearings 74 and gears 72 such that first and second ends 82, 84 of each shaft 76 may extend axially outward beyond bearings 74 and gears 72. Shafts 76 are configured to fit within openings 60 in carrier member 32 with bores 86 within openings 60.

Carrier 20 may include a cover 90. Cover 90 may include an annular base 92 with opposite first and second surfaces with radially outer and inner walls 98, 100 extending therebetween. Outer wall 98 defines a radially outer periphery of cover 90. Inner wall 100 defines a central opening 102 through which shaft 22 may be inserted. Base 92 may include a plurality of openings 104 that extend between the first and second surfaces. Openings 104 are configured to receive second ends 84 of shafts 76. Outer wall 98 may include a plurality of extension features 106 spaced apart therealong.

Carrier 20 may include a plurality of washers 110. Washers 110 each have an opening 112 configured to receive shafts 76. When assembled, shafts 76 are disposed in openings 80 in bearings 74 which are disposed in openings 78 in gears 72. First and second ends 82, 84 of shafts 76 extend through openings 112 in washers 110 with first ends 82 disposed in openings 60 in carrier member 32 and second ends 84 disposed in openings 104 in cover 90. Cover 90 may be assembled to carrier member 32 by having ears 46 extend over outer wall 98 between extensions features 106. Cover 90 may be secured to carrier member 32 in a variety of manners, such as by welding for example. Shaft 22 may be inserted through opening 44 in carrier member 32 and through opening 102 in cover 90 until flange 30 is disposed in opening 102. First end 24 of shaft 22 may extend axially outward beyond cover 90.

Figure 4:
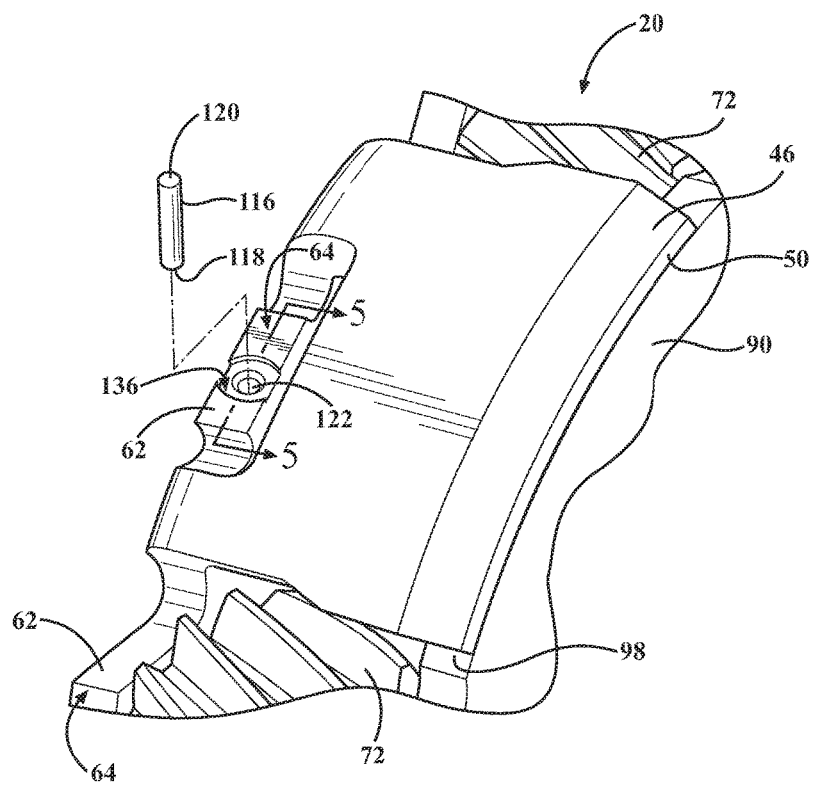
FIG. 4 is an enlarged fragment view of a portion of the pin type carrier of FIG. 1 illustrating the insertion of a pin.
Figure 5A:
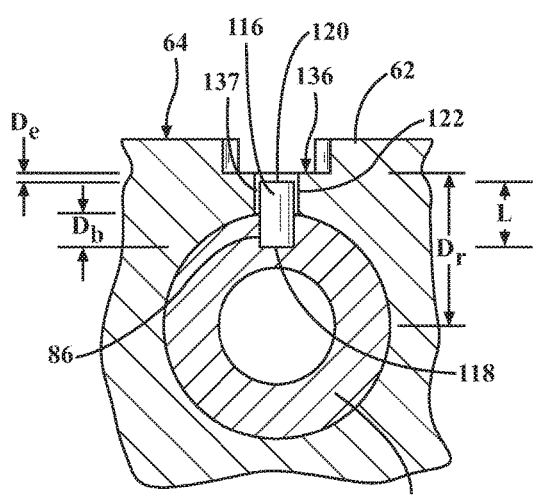
FIGS. 5A and 5B are a fragmented cross-sectional view of the pin type carrier along line 5-5 of FIG. 4 illustrating the pin, respectively, inserted and staked.
Figure 5B:
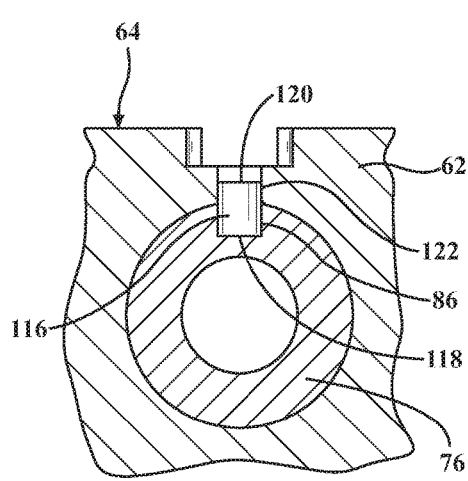
Figure 6:
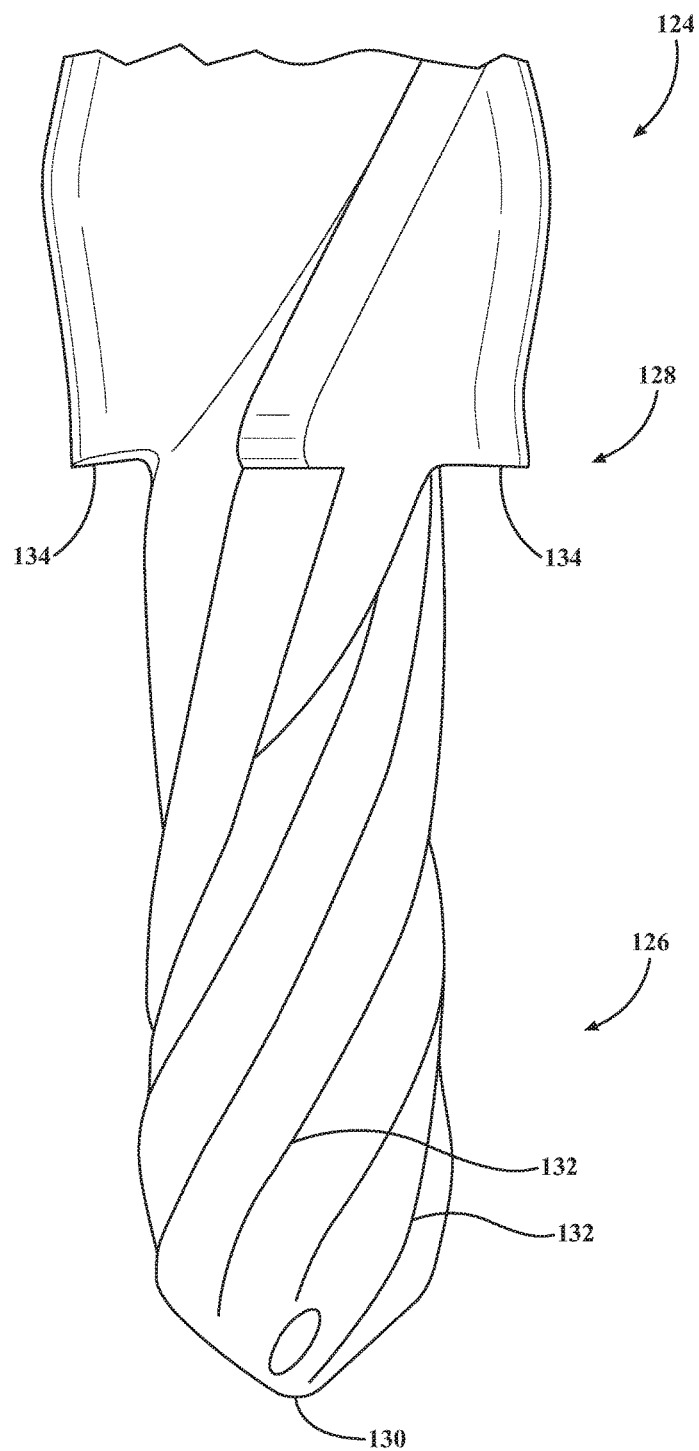
FIG. 6 is a fragmented plan view of an exemplary tool that may be used to machine the pin type carrier of FIG. 1.

Referring to FIGS. 4-6, shafts 76 are secured within carrier 20 by pins 116 having opposite first and second ends 118, 120 and an axial length L therebetween. Axial length L is a predetermined length. Bores 86 in shafts 76 are aligned with holes 122 in top surface 64 of mounting features 62. Bores 86 have a radial depth $D_b$ of a predetermined amount. First ends 118 of pins 116 are inserted through holes 122 and into bores 86. Pins 116 axially and rotationally secure shafts 76 relative to carrier member 32. Pins 116 are secured to carrier member 32 by a staking operation. Proper staking of pins 116 requires that second ends 120 extend a predetermined distance $D_e$ below the adjacent portions of top surface 64 so that the deformation caused by the staking operation secures pins 116 to carrier member 32. For example, second ends 120 may be required to extend below the adjacent portions of top surface 64 a set distance +/−50 microns. In order to ensure the proper extension, top surface 64 of mounting feature 62 may be machined to be a set radial distance $D_r$ from a reference point, such as an axial centerline of shaft 76 by way of non-limiting example.

In prior art carriers, each mounting feature 62 in an opening 58 of an ear 46 is individually machined, such as by milling or the like, so that the entire top surface 64 is at the set radial distance $D_r$. In prior art applications, each mounting feature 62 not associated with an ear 46 is machined by placing the carrier member 32 in a lathe and machining the entire top surfaces 64 of all of these mounting features 62 so that the entire top surfaces 64 are at the set radial distance $D_r$. Holes 122 are drilled through the mounting features 62 in a separate operation either subsequent to or prior to the machining of top surface 64. This manufacturing process is time consuming, requires excessive set up and is in efficient in that it removes more material than is necessary.

In one or more arrangements, forming hole 122 and machining of a portion of top surface 64 in each mounting feature 62 is performed in a single process. For example, a tool 124, such as that shown in FIG. 6, may be used to drill hole 122 and machine a portion of top surface 64 to the desired radial distance $D_r$ in a single process. Tool 124 may include a leading drill bit portion 126 and a trailing end mill portion 128. Drill bit portion 126 may include a tip 130 and a plurality spiraling cutting edges 132. End mill portion 128 may include a plurality of cutting edges 134 that extend radially outwardly. Carrier member 32 may be placed in a jig or other suitable device and tool 124 may be positioned at a desired location facing top surface 64. Tool 124 may be rotated and advanced toward top surface 64. Drill bit portion 126 will cut through mounting feature 62 and form hole 122. As trailing end mill portion 128 contacts top surface 64, the area immediately surrounding hole 122 will be milled as tool 124 continues to advance and formed into a milled surface 136 below top surface 64. Tool 124 advances until milled surface 136 is at the desired radial distance $D_r$. Tool 124 may then be retracted. As a result, hole 122 and milled surface 136 are formed in a single process. Additionally, milled surface 136 may be formed in only a portion of top surface 64 thereby avoiding the unnecessary milling of the entire top surface 64 as is done in the prior art. In one or more arrangements, tool 124 may be moved to a new location facing top surface 64 and the next hole 122 and milled surface 136 formed. In one or more arrangements, multiple tools 124 may be utilized simultaneously so that some or all of the holes 122 and milled surfaces 136 are formed simultaneously utilizing a single set up and machining operation.

Referring to FIGS. 4 and 5, the staking operation to secure each shaft 76 within carrier 20 is illustrated. Bore 86 is aligned with hole 122 and pin 116 is inserted, first end 118 first, through hole 122 and into bore 86. Pin 116 is inserted until first end 118 reaches the bottom of bore 86. An annular gap 137 may exist between hole 122 and the outer surface of pin 116. Second end 120 extends below the adjacent milled surface 136 the desired distance $D_e$. Next second end 120 is deformed by striking second end 120 with a staking tool (not shown), as known in the art. The strike by the striking tool deforms pin 116 and second end 120. As a result, the diameter of pin 116 within hole 122 may expand, filling any existing gap 137. This deformation secures pin 116 to carrier member 32 thereby rotationally and axially securing shaft 76. It should be appreciated that other staking operations, as known in the art, may be utilized. For example, the strike by the striking tool may deform hole 122, such as into an oval shape, so that pin 116 cannot be removed therefrom. This deformation secures pin 116 to carrier member 32 thereby rotationally and axially securing shaft 76.

Thus, carrier 20 may be formed by using the methods disclosed herein. The forming of holes 122 and machined surface 136 having a desired radial distance $D_r$ may be done simultaneously using a combined drilling and milling tool 124. The method reduces machining time and set up. The cost to produce carrier 20 may be reduced. Additionally, a more efficient machining operation is realized by only machining a portion of top surface 64 of mounting features 62.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC). The term "operatively connected" as used throughout this description, can include direct or indirect connections, including connections without direct physical contact.

The terms related to orientation, such as vertical, horizontal, above, below, longitudinal, lateral, etc. are based on the relative orientation of the components as shown in the FIGs. It should be appreciated that the components may be arranged in a different orientation and that the terms used herein a relative terms.

Aspects herein can be embodied in other forms without departing from the spirit or essential attributes thereof. Accordingly, reference should be made to the following claims, rather than to the foregoing specification, as indicating the scope of the invention. It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means plus-function format and are not intended to be interpreted based on 35 U.S.C. 112, sixth paragraph, unless and until such claim limitations expressly use the phrase "means for" followed by a statement of function void of further structure.

What is claimed is:

1. A pin type carrier comprising:
   a carrier member having an opening;
   a mounting feature bordering the opening, the mounting feature having a top surface and a hole extending therethrough from the top surface to the opening, with a partial portion of the top surface adjacent the hole machined further toward the opening than a remaining portion of the top surface to a specific radial dimension;
a shaft disposed in the opening, the shaft having a gear thereon and a radially extending bore therein aligned with the hole in the mounting feature; and
a pin having a first end disposed in the bore of the shaft and an opposite second end disposed in the hole in the mounting feature, the pin rotationally and axially securing the shaft relative to the carrier member, and retained to the carrier member by a staking operation whereby at least one of the second end thereof and the hole in the mounting feature is deformed in reliance on the specific radial dimension.

2. The pin type carrier of claim 1, wherein the second end of the pin is below the partial portion of the top surface of the mounting feature.

3. The pin type carrier of claim 1, wherein the partial portion of the top surface of the mounting feature is circular and circumscribes the hole in the mounting feature.

4. The pin type carrier of claim 1, wherein the carrier member includes an ear portion extending outwardly therefrom and the mounting feature is associated with the ear portion.

5. The pin type carrier of claim 1, wherein the pin type carrier is a planetary gear carrier.

6. The pin type carrier of claim 1, wherein the carrier member has a generally circular periphery and the mounting feature is disposed along the periphery.

7. The pin type carrier of claim 1, wherein the partial portion of the top surface of the mounting feature is machined tangentially flat further toward the opening than the remaining portion of the top surface to the specific radial dimension.

8. The pin type carrier of claim 1, wherein:
the opening is one of a plurality of corresponding openings;
the mounting feature is one of a plurality of corresponding mounting features respectively associated with the openings;
the shaft is one of a plurality of corresponding shafts respectively associated with the openings and the mounting features; and
the pin is one of a plurality of corresponding pins respectively associated with the mounting features and the shafts.

9. A method of assembling a pin type carrier, the method comprising:
providing a carrier member with an opening and a mounting feature bordering the opening, the mounting feature having a top surface;
drilling a hole through the mounting feature from the top surface of the mounting feature to the opening;
machining a partial portion of the top surface of the mounting feature adjacent the hole in the mounting feature further toward the opening than a remaining portion of the top surface of the mounting feature to a specific radial dimension;
inserting a shaft having a gear thereon and a radially extending bore therein into the opening with the bore of the shaft aligned with the hole in the mounting feature;
inserting a pin having a first end and an opposite second end into the hole in the mounting feature and the bore of the shaft so that the first end of the pin is bottomed out in the bore of the shaft and the second end of the pin is below the partial portion of the top surface of the mounting feature, thereby rotationally and axially securing the shaft relative to the carrier member; and
staking the pin to the carrier member whereby at least one of the second end thereof and the hole in the mounting feature is deformed in reliance on the specific radial dimension, thereby retaining the pin to the carrier member.

10. The method of claim 9, wherein the drilling and machining steps are performed in a single process with a tool having a leading drill portion and a trailing milling portion.

11. The method of claim 10, wherein the second end of the pin prior to the staking step extends below the partial portion of the top surface of the mounting feature a predetermined distance set by the specific radial dimension.

12. The method of claim 10, wherein the machining step includes machining the partial portion of the top surface of the mounting feature but not the remaining portion of the top surface of the mounting feature.

13. The method of claim 12, wherein the partial portion of the top surface of the mounting feature is circular and circumscribes the hole in the mounting feature.

14. The method of claim 9, wherein the carrier member includes an ear portion extending outwardly therefrom and the mounting feature is associated with the ear portion.

15. The method of claim 9, wherein the carrier member has a generally circular periphery and the mounting feature is disposed along the periphery.

16. The method of claim 9, wherein the pin type carrier is a planetary gear carrier.

17. A method of assembling a planetary gear carrier, the method comprising:
providing a carrier member with a carrier member opening and a mounting feature bordering the carrier member opening, the mounting feature having a top surface;
providing a cover with a cover opening extending therethrough;
drilling a hole through the mounting feature from the top surface of the mounting feature to the carrier member opening;
machining a partial portion of the top surface of the mounting feature adjacent the hole in the mounting feature further toward the carrier member opening than a remaining portion of the top surface of the mounting feature to a specific radial dimension;
inserting a first end of a shaft having a roller bearing and a gear thereon and a radially extending bore therein into the carrier member opening with the bore of the shaft aligned with the hole in the mounting feature;
inserting a second end of the shaft into the cover opening;
attaching the cover to the carrier member;
inserting a pin having a first end and an opposite second end into the hole in the mounting feature and the bore of the shaft so that the first end of the pin is bottomed out in the bore of the shaft and the second end of the pin is below the partial portion of the top surface of the mounting feature, thereby rotationally and axially securing the shaft relative to the carrier member; and
staking the pin to the carrier member whereby at least one of the second end thereof and the hole in the mounting feature is deformed in reliance on the specific radial dimension, thereby retaining the pin to the carrier member;
wherein the drilling and machining steps are performed in a single process with a tool having a leading drill portion and a trailing milling portion.

18. The method of claim 17, wherein the second end of the pin prior to the staking step extends below the partial portion of the top surface of the mounting feature a predetermined distance set by the specific radial dimension.

19. The method of claim 17, wherein the machining step includes machining the partial portion of the top surface of the mounting feature but not the remaining portion of the top surface of the mounting feature.

20. The method of claim 17, wherein the partial portion of the top surface of the mounting feature is circular and circumscribes the hole in the mounting feature.

* * * * *

UNITED STATES PATENT AND TRADEMARK OFFICE
CERTIFICATE OF CORRECTION

PATENT NO. : 10,228,053 B2
APPLICATION NO. : 15/199438
DATED : March 12, 2019
INVENTOR(S) : Luke A. Rippelmeyer et al.

Page 1 of 1

It is certified that error appears in the above-identified patent and that said Letters Patent is hereby corrected as shown below:

In the Claims

Column 7, Line 32: Claim 7 Replace "the top surface" with --the top surface of the mounting feature--

Signed and Sealed this
Nineteenth Day of November, 2019

Andrei Iancu
*Director of the United States Patent and Trademark Office*